(12) United States Patent
Yoshida et al.

(10) Patent No.: US 10,716,440 B2
(45) Date of Patent: Jul. 21, 2020

(54) CLEANER

(71) Applicant: Samsung Electronics Co., Ltd., Suwon-si, Gyeonggi-do (KR)

(72) Inventors: Minoru Yoshida, Yokohama (JP); Kenji Kitajima, Yokohama (JP); Tetsuya Ito, Yokohama (JP); Yasunori Kubo, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 15/741,469

(22) PCT Filed: Jun. 24, 2016

(86) PCT No.: PCT/KR2016/006737
§ 371 (c)(1),
(2) Date: Jan. 2, 2018

(87) PCT Pub. No.: WO2017/003134
PCT Pub. Date: Jan. 5, 2017

(65) Prior Publication Data
US 2018/0360278 A1 Dec. 20, 2018

(30) Foreign Application Priority Data

Jun. 30, 2015 (JP) .................................. 2015-131583
Mar. 18, 2016 (JP) .................................. 2016-055242
Jun. 15, 2016 (KR) ........................ 10-2016-0074220

(51) Int. Cl.
*A47L 5/22* (2006.01)
*A47L 9/22* (2006.01)
(Continued)

(52) U.S. Cl.
CPC ...................................... *A47L 5/22* (2013.01); *A47L 5/28* (2013.01); *A47L 9/22* (2013.01); *A47L 9/28* (2013.01);
(Continued)

(58) Field of Classification Search
CPC .. A47L 5/22; A47L 9/28; H02K 16/00; H02K 16/02
(Continued)

(56) References Cited

U.S. PATENT DOCUMENTS 6,316,858 B1    11/2001  Phillips
10,165,912 B2 *  1/2019  Conrad .................. A47L 5/225
(Continued)

FOREIGN PATENT DOCUMENTS

CN          1261474 A      7/2000
CN        102124637 A      7/2011
(Continued)

OTHER PUBLICATIONS

ISA/KR, "International Search Report and Written Opinion of the International Searching Authority," International Application No. PCT/KR2016/006737, dated Oct. 11, 2016, 15 pages.
(Continued)

*Primary Examiner* — David Redding

(57) ABSTRACT

More powerful and convenient cleaners are provided. A cleaner includes a suction fan portion, and a driver driving the suction fan portion, wherein the driver comprises a driving motor having a plurality of rotors configured to rotate, wherein the suction fan portion comprises a first fan rotated by a first rotor and a second fan rotated by a second rotor of the driving motor, wherein the driving motor further comprises a stator commonly used for the first rotor and the second rotor.

17 Claims, 13 Drawing Sheets

(51) Int. Cl.
*A47L 9/28* (2006.01)
*A47L 5/28* (2006.01)
*H02K 16/02* (2006.01)

(52) U.S. Cl.
CPC ........... *A47L 9/2842* (2013.01); *A47L 9/2878* (2013.01); *A47L 9/2884* (2013.01); *H02K 16/02* (2013.01)

(58) Field of Classification Search
USPC .................................. 15/422.2; 310/114, 115
See application file for complete search history.

(56) References Cited

U.S. PATENT DOCUMENTS

| | | | |
|---|---|---|---|
| 2011/0175468 A1 | 7/2011 | Dutau | |
| 2013/0269147 A1* | 10/2013 | Conrad | A47L 5/225 15/329 |
| 2014/0086761 A1 | 3/2014 | Abe et al. | |

FOREIGN PATENT DOCUMENTS

| | | |
|---|---|---|
| CN | 202721558 U | 2/2013 |
| CN | 203584844 U | 5/2014 |
| EP | 2609844 A2 | 7/2013 |
| EP | 2609844 A3 | 5/2016 |
| JP | H10-231799 A | 9/1998 |
| JP | 2008-303793 A | 12/2008 |
| JP | 2015-000342 A | 1/2015 |
| KR | 10-2004-0021333 A | 3/2004 |
| KR | 10-2013-0077550 A | 7/2013 |
| TR | 200103449 T2 | 5/2002 |
| WO | 0072740 A1 | 12/2000 |

OTHER PUBLICATIONS

European Patent Office, "Supplementary European Search Report," Application No. EP 16818167.5, dated Jul. 19, 2018, 6 pages.
First Office Action in connection with Chinese Application No. 201680038378.8 dated Dec. 9, 2019, 17 pages.

* cited by examiner

【FIG. 1】
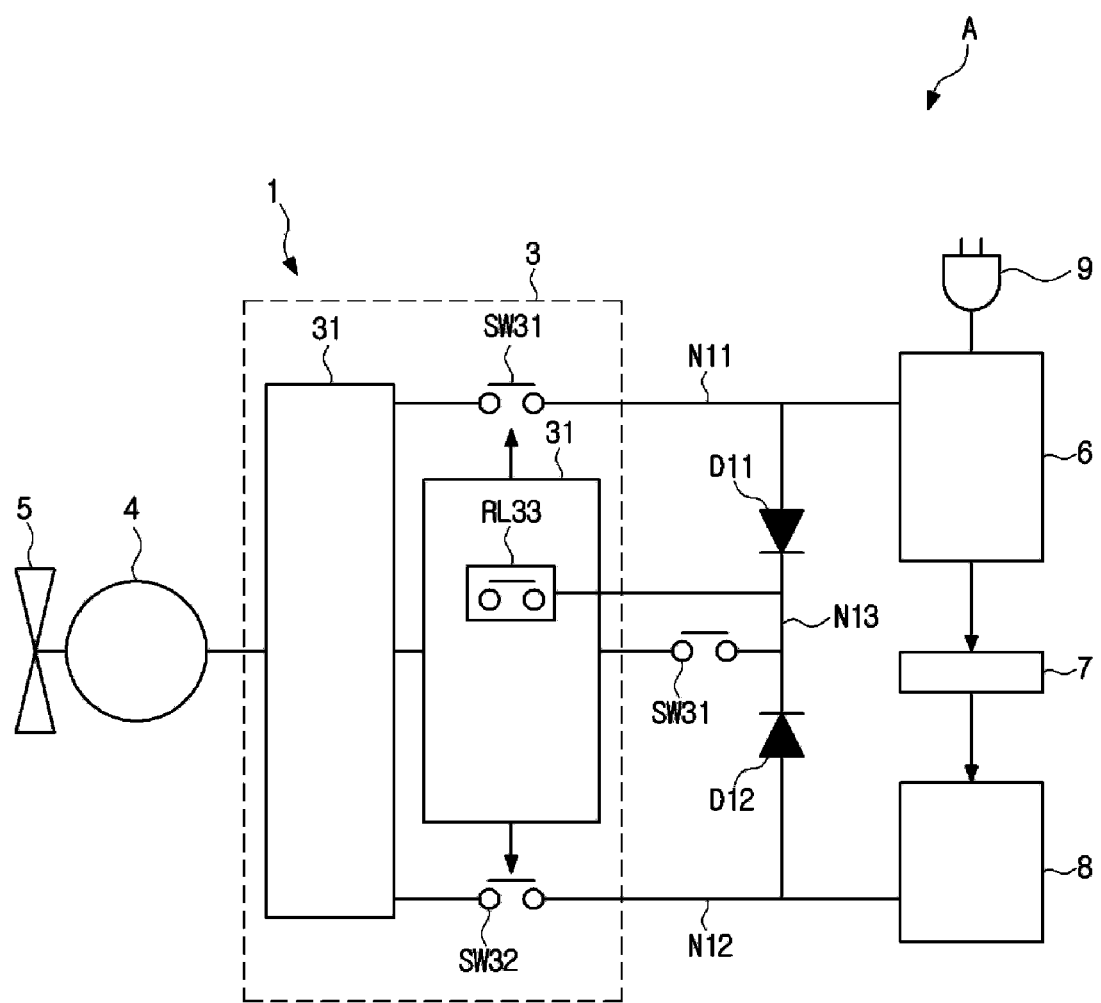

【FIG. 2a】
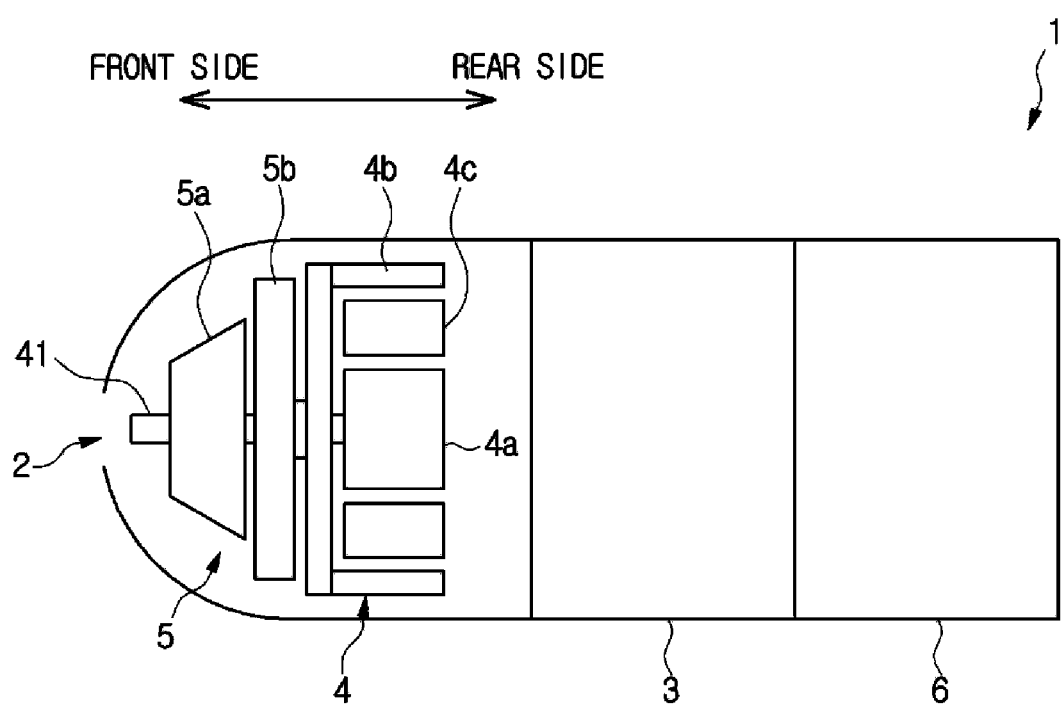

【FIG. 2b】
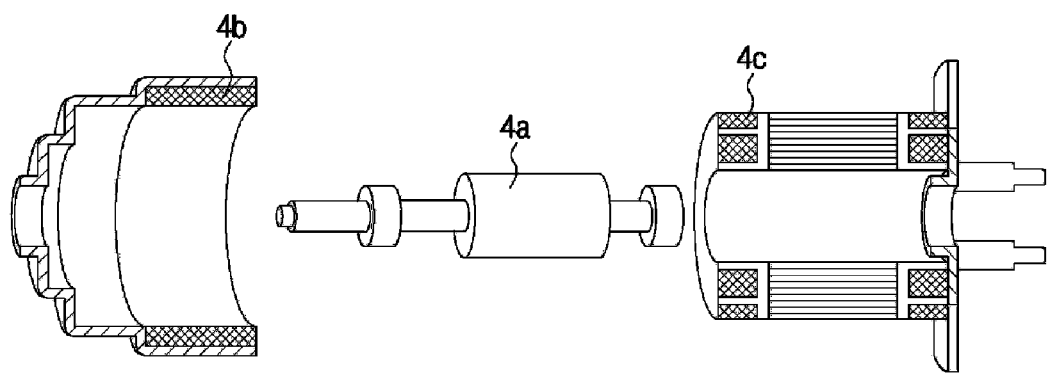

【FIG. 3】
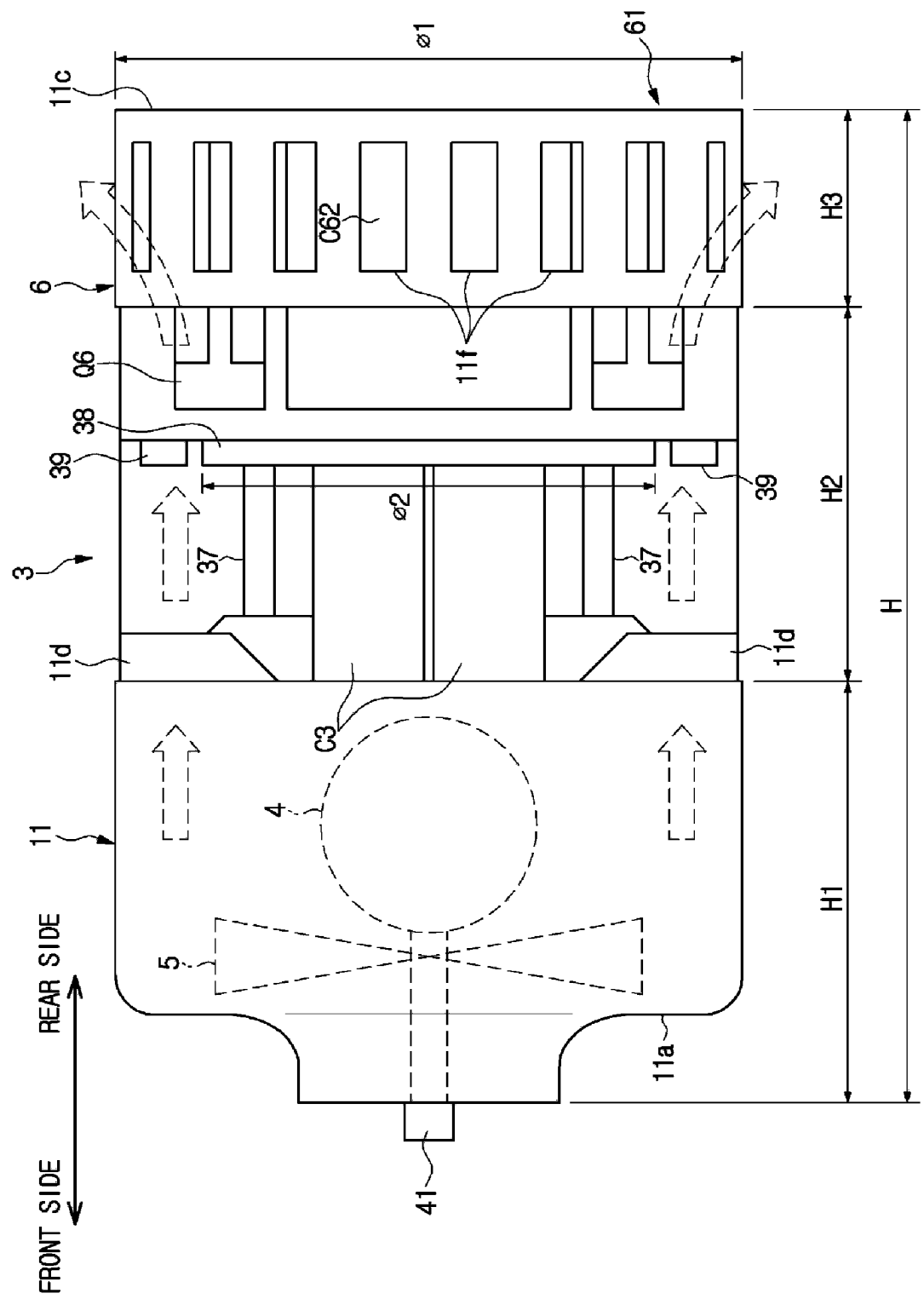

[FIG. 4]
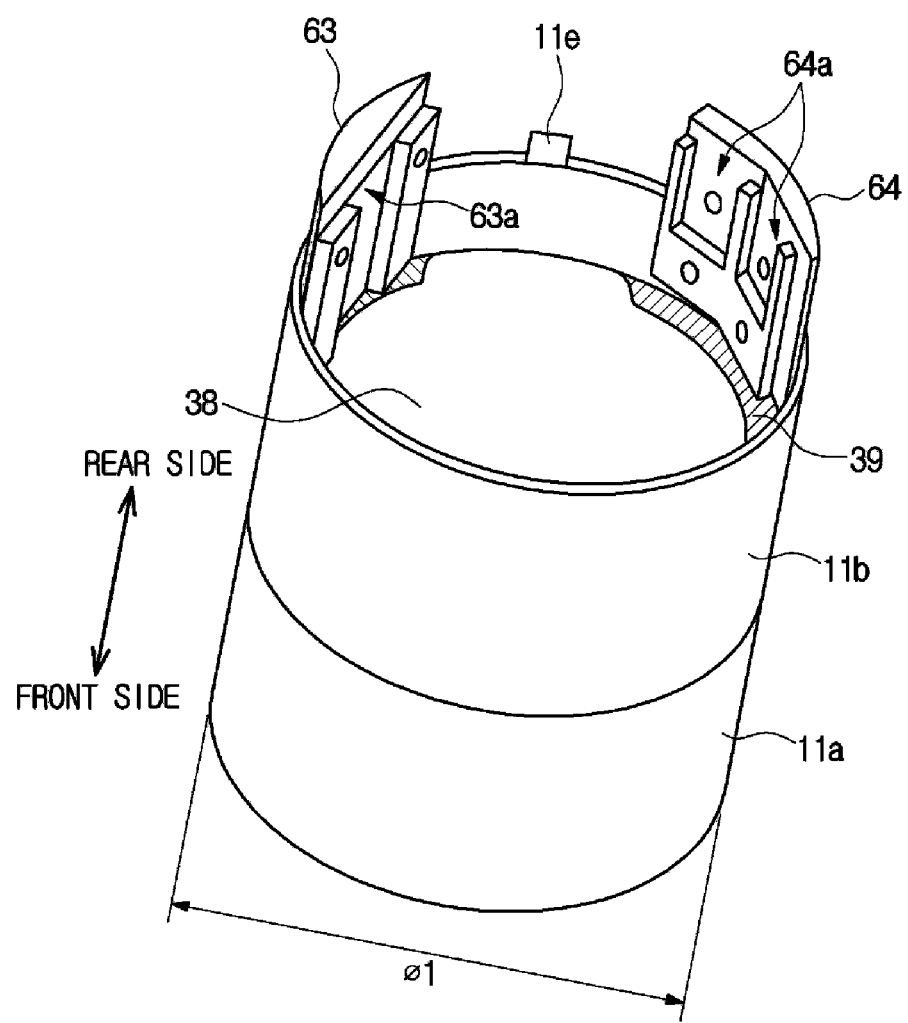

[FIG. 5]
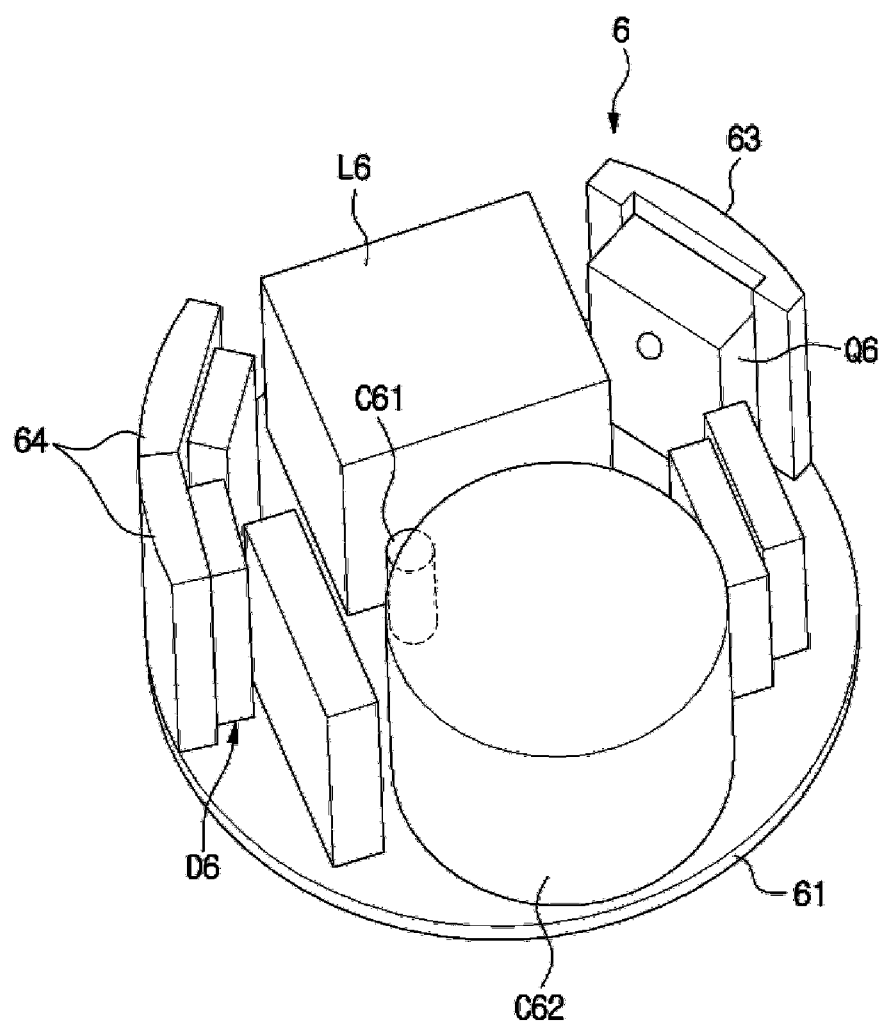

[FIG. 6]
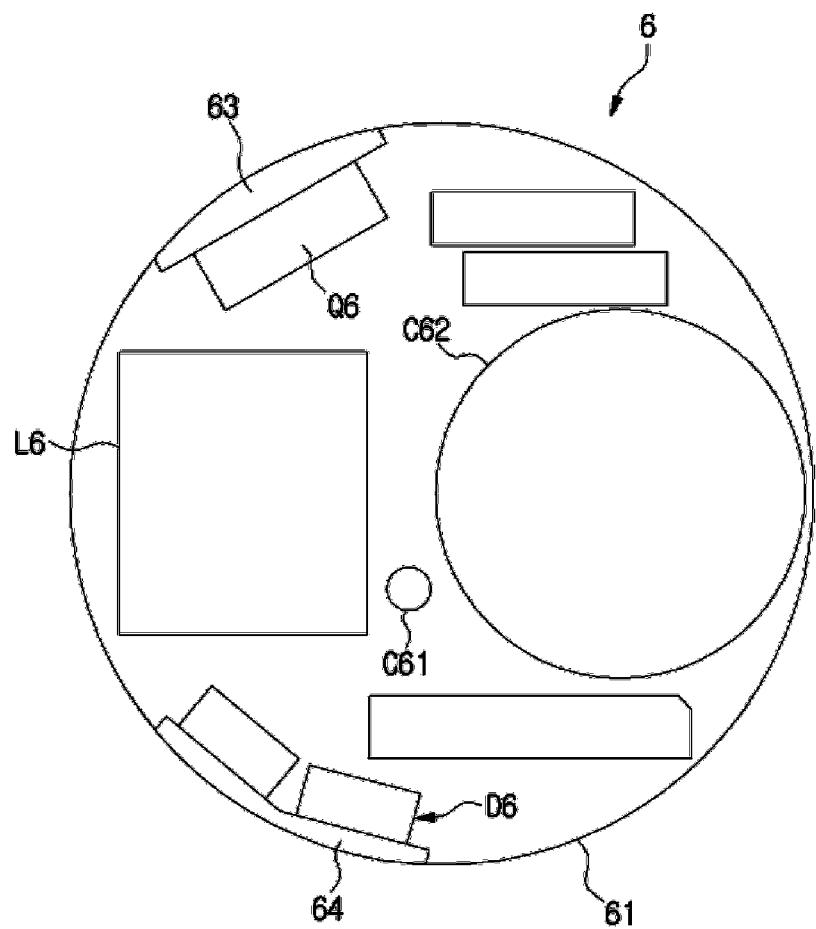

【FIG. 7】
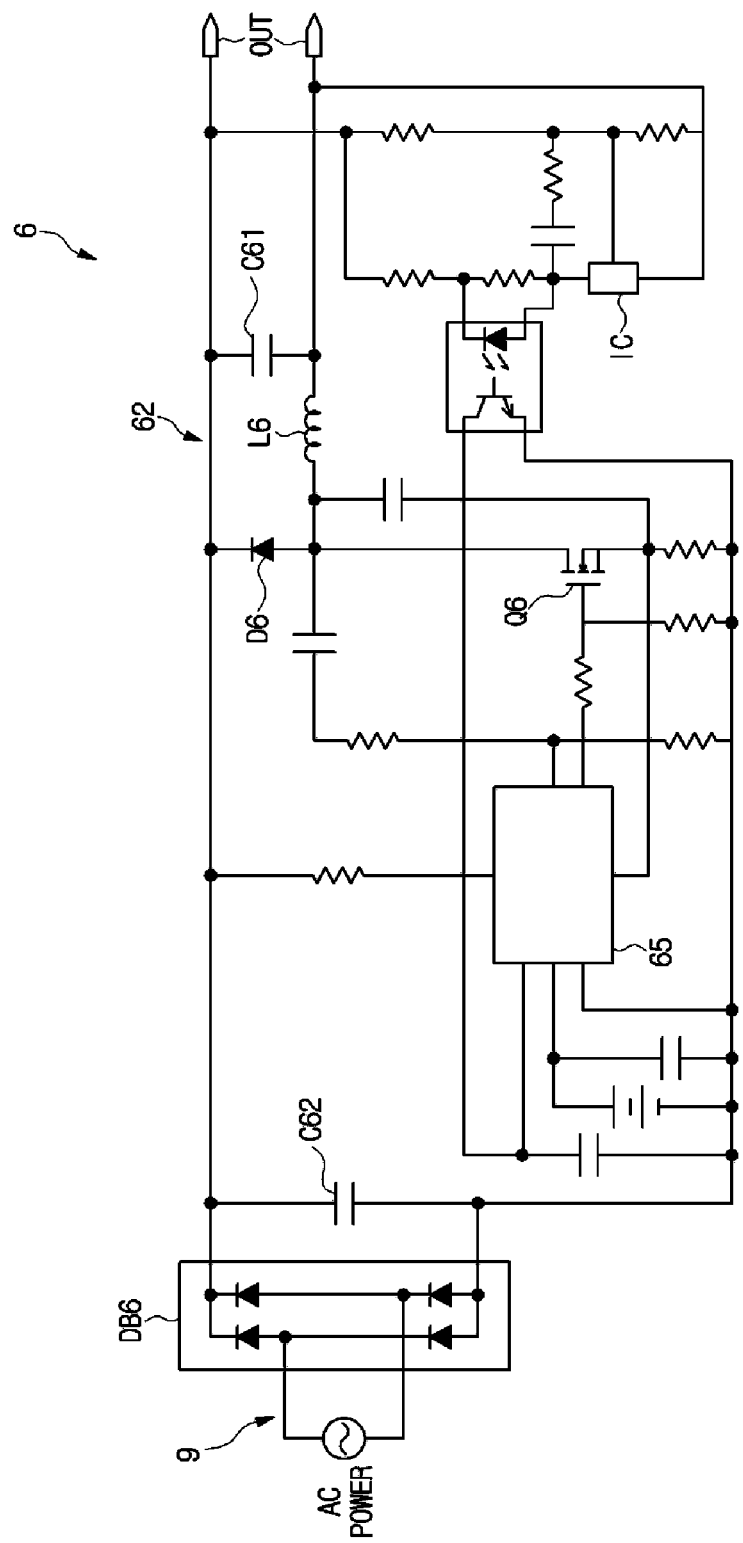

[FIG. 8]
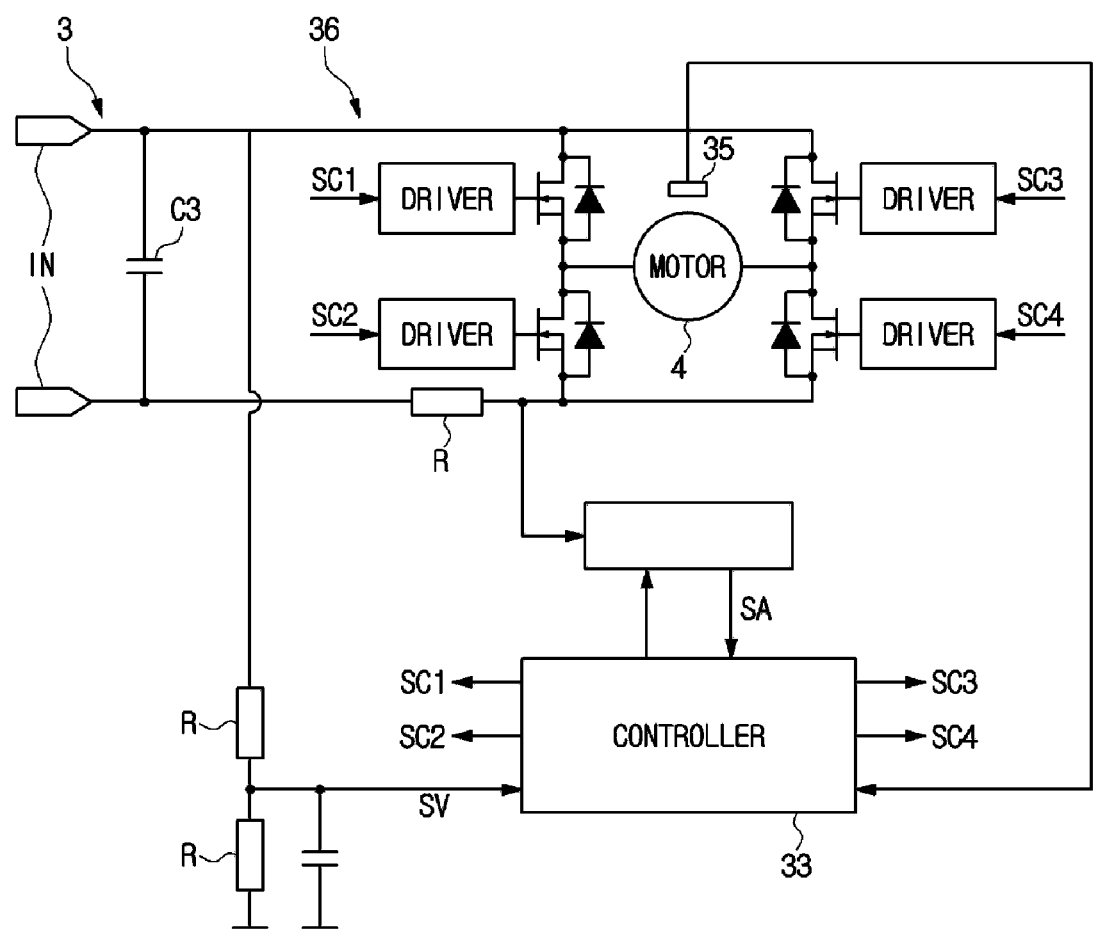

【FIG. 9】
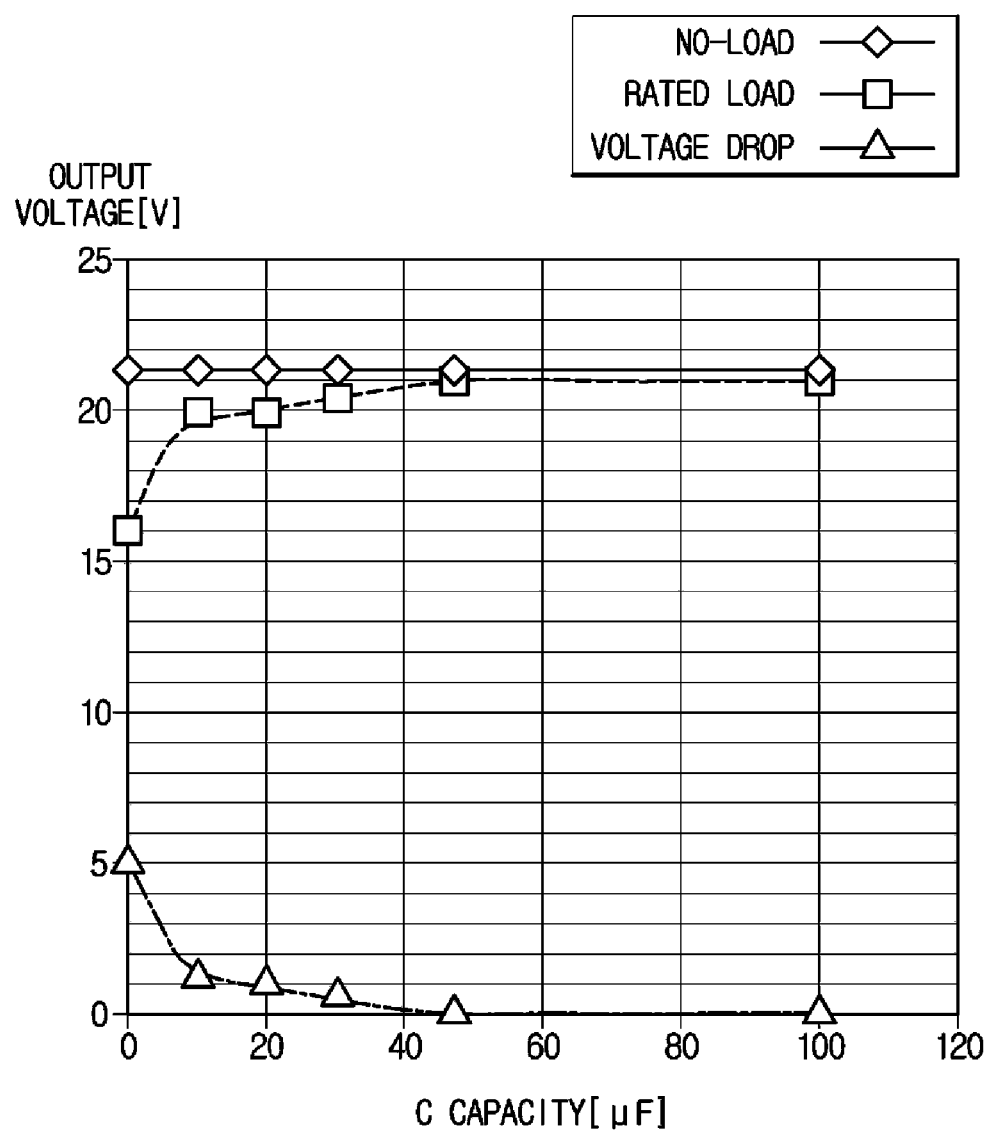

【FIG. 10】
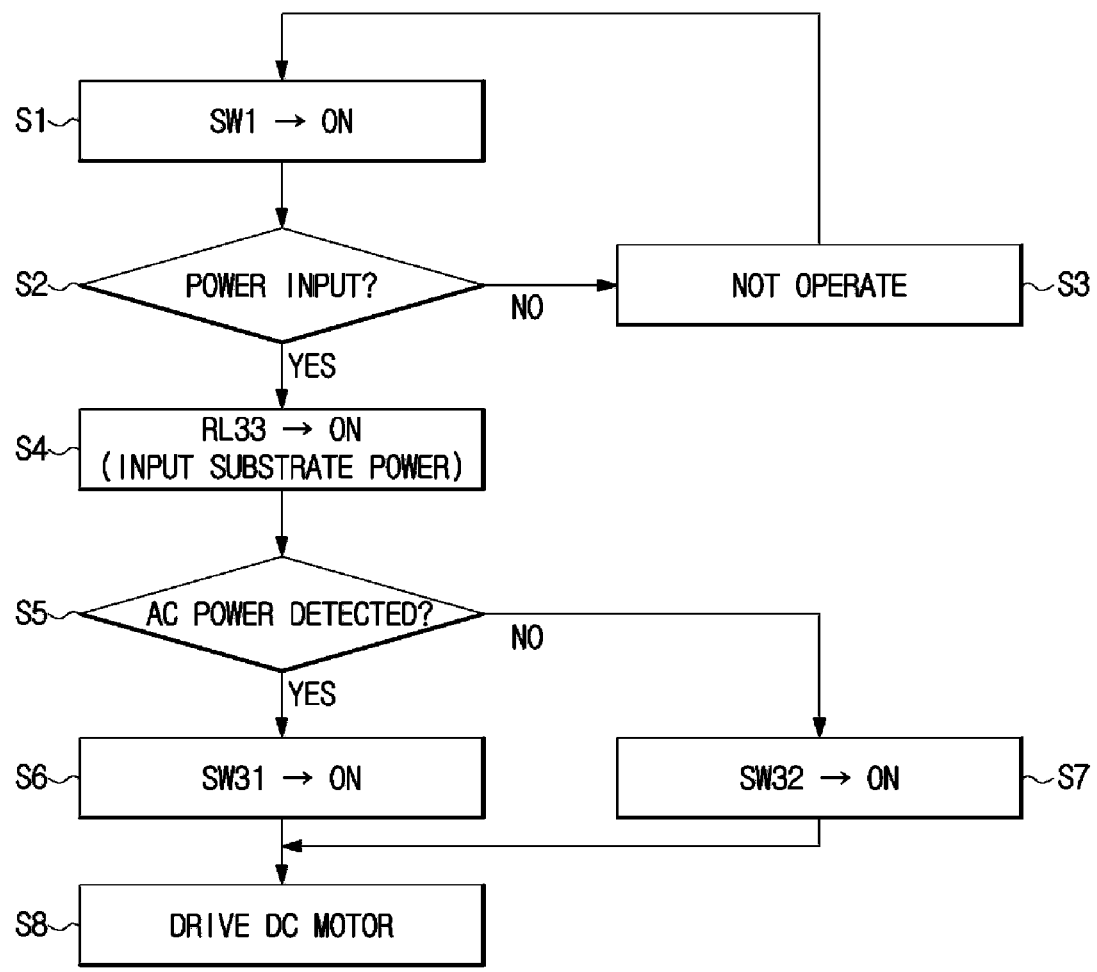

【FIG. 11】
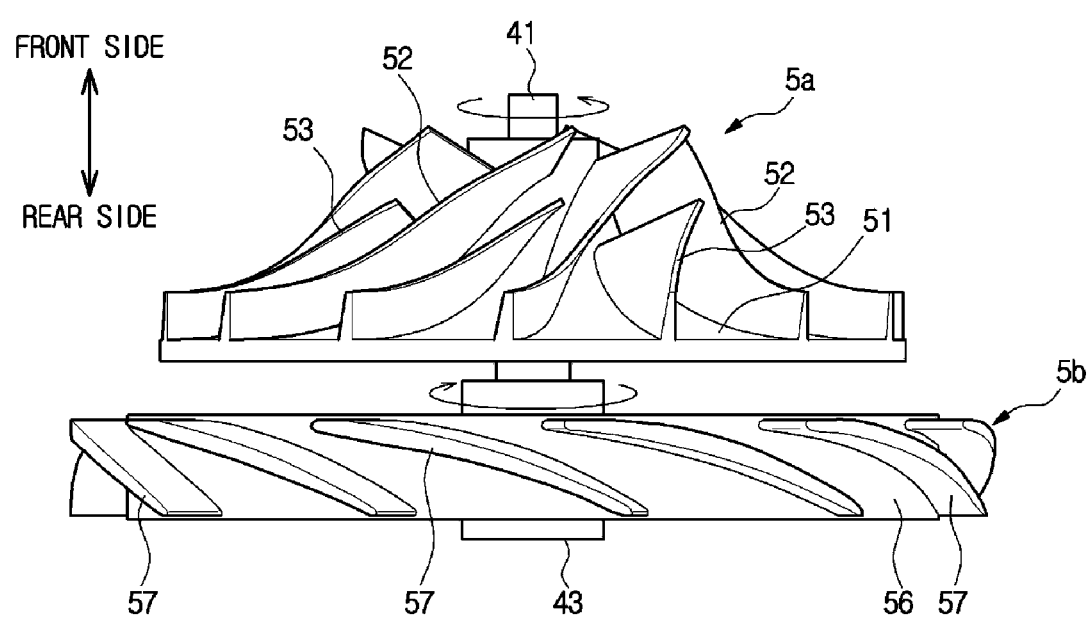

【FIG. 12】
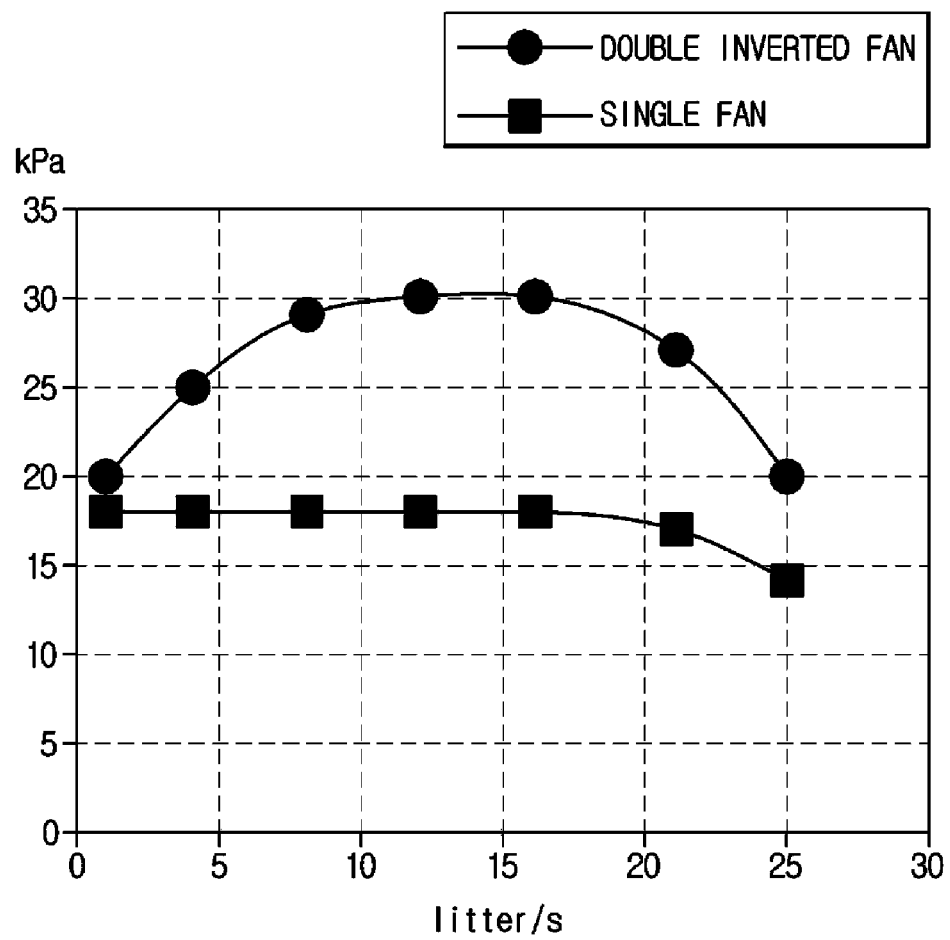

CLEANER

CROSS-REFERENCE TO RELATED APPLICATIONS AND CLAIM OF PRIORITY

The present application claims priority under 35 U.S.C. § 365 and is a 371 National Stage of International Application No. PCT/KR2016/006737 filed Jun. 24, 2016, which claims the benefit of Japanese Patent Application No. 2015-131583, filed Jun. 30, 2015, Japanese Patent Application No. 2016-055242, filed Mar. 18, 2016, and Korean Patent Application No. 10-2016-0074220 filed Jun. 15, 2016, the disclosures of which are fully incorporated herein by reference into the present disclosure as if fully set forth herein.

TECHNICAL FIELD

Exemplary embodiments of the present disclosure relate to a cleaner, more particularly to a cordless stick type cleaner.

BACKGROUND

In recent, a cordless stick type cleaner has been widely used since the high power lithium ion battery having the small size and the light weight is purchased at a relative low cost thanks to the improvement of the performance of lithium ion battery. Such a cleaner has been popular due to the high convenience and the lightweight since the cleaner is not provided with a power cord. A cordless stick type cleaner is disclosed in patent document 1 as an example of thereof.

PATENT DOCUMENT

Patent document 1: Japanese unexamined Patent Application Publication No 2015-159841

SUMMARY

In the conventional manner, a cordless cleaner has a low suction rate of approximately 25 W~100 W even at the strong mode, which is lower than the canister type cleaner having the suction rate of approximately 180 W.

Therefore, there is a growing trend for a user to have two cleaners, wherein the user has the canister type cleaner as the main cleaner and the cordless cleaner as the auxiliary cleaner. Naturally, it is preferable for the user to have one cleaner. For this reason, it is required that convenient and strong cordless stick type cleaners are developed.

Therefore, it is an aspect of the present disclosure to provide a cleaner having a fan structure configured to generate the suction force in the inside of the cleaner, more particularly, a cordless stick type cleaner having the strong suction force.

According to an aspect of the present invention, there is provided a cleaner including: a suction fan portion; and a driver driving the suction fan portion, wherein the driver comprises a driving motor having a plurality of rotors configured to rotate, wherein the suction fan portion comprises a first fan rotated by a first rotor and a second fan rotated by a second rotor of the driving motor, wherein the driving motor further comprises a stator commonly used for the first rotor and the second rotor.

The driving motor may be provided with two rotors and a single stator.

Any one of the first fan and the second fan may be an axial flow fan in which a direction of air flow is parallel with a rotary shaft.

Any one of the first fan and the second fan may be an axial flow fan in which a direction of air flow is parallel with a rotary shaft, and the other fan may be one of a centrifugal fan flowing the air from the inside to the circumferential direction by the centripetal force or a mixed flow fan having a middle characteristic between the axial flow fan and the centrifugal fan.

The first fan and the second fan may be rotated in opposite direction to each other.

The driving motor may correspond to a brushless DC motor, wherein the first rotor may be an outer rotor, the second rotor may be an inner rotor, and the stator may be disposed between the inner rotor and the outer rotor.

The cleaner may further include an inverter controlling the rotation of the first and second rotor.

The cleaner may further include a power portion having a battery and an AC-DC converter to supply the electricity to the driving motor.

The AC-DC converter may be a non-isolated flyback converter, wherein the battery and the AC-DC converter may include a DC output condenser, respectively, and the electric capacity of the condenser in the driving motor may be at least 40 times greater than the electric capacity of a condenser in the AC-DC converter.

The cleaner may further include a start switch staring an operation; and a controller supplying the power to the driving motor from at least any one of the battery and the AC-DC converter, when the start switch is pushed.

The cleaner may further include a motor case corresponding to a container for the driving motor; and a heat sink plate dissipating the heat of the power portion, wherein the motor case may include a metal portion, wherein the heat sink plate and the metal portion of the motor case may be connected to allow the heat transfer.

The cleaner may be a cordless stick type cleaner.

According to another aspect of the present invention, there is provided a cleaner includes: an inlet port: and a suction fan portion communicated with the inlet port, wherein the suction fan portion may include a first fan and a second fan rotated in a direction opposite to the first fan, wherein the first fan may be installed closer to the inlet port than the second fan.

The second fan may be an axial flow fan in which a direction of air flow is parallel with a rotary shaft, and the first fan may be one of a centrifugal fan flowing the air from the inside to the circumferential direction by the centripetal force or a mixed flow fan having a middle characteristic between the axial flow fan and the centrifugal fan.

An outer diameter of the first fan may be equal to or less than an outer diameter of the second fan, and a length of the first fan in the direction toward the center of the rotation may be longer than a length of the second fan in the direction toward the center of the rotation.

In accordance with one aspect of the present disclosure, it is possible to provide a cleaner having a high suction rate by having a double inverted fan in the suction fan portion generating the suction force inside of the cleaner, wherein the double inverted fan is provided such that a first fan is provided with any one of a mixed flow fan or a centrifugal fan and a second fan is provided with an axial flow fan.

BRIEF DESCRIPTIONS OF THE DRAWINGS

FIG. 1 is a block diagram of basic composition of a wireless stick type cleaner according to an exemplary embodiment;

FIGS. 2A and 2B are schematic diagrams showing system composition of a mechanism integrated motor;

FIG. 3 is a side view of the mechanism integrated motor;

FIG. 4 is a perspective view showing a connection state of a metal case portion and a heat sink plate;

FIG. 5 is a perspective view of a power portion as viewed from the rear of the mechanism integrated motor;

FIG. 6 is a plan view of the power portion;

FIG. 7 is a circuit diagram showing composition of the power portion;

FIG. 8 is a circuit diagram showing composition of a drive circuit;

FIG. 9 is a diagram showing the relationship between the capacitance change and the output voltage change of a first condenser;

FIG. 10 is a flowchart of the start of the cleaner (A) according to an exemplary embodiment;

FIG. 11 is a side view of the suction fan portion according to an exemplary embodiment; and FIG. 12 is a graph showing the air volume-static pressure characteristics in an exemplary embodiment and the comparative examples.

DETAILED DESCRIPTION

Hereinafter exemplary embodiments of the present disclosure will be described in details with reference to drawings. In addition, the one or more exemplary embodiments may be embodied in many different forms, and should not be construed as being limited to the exemplary embodiments set forth herein.

According to the disclosed embodiment, a cleaner A is a cordless stick cyclone type. As illustrated in FIG. 1, the cleaner A is provided with a mechanism integrated motor 1 and a battery 8 in a housing of the cleaner, which is not shown in the drawings, and the cleaner A is connected to the commercial power via a power cord 9, wherein an inlet port is opened in the housing.

"Front" represents a front end side (the inlet port side of the housing) of the cleaner A and "rear" represents a gripping portion (not shown) of the cleaner A.

The mechanism integrated motor 1 may include a non-isolated power portion 6 converting an AC power, which is supplied from the commercial power, into a DC power, a brushless DC motor portion 4 (driver) generating a suction force, a drive circuit 3 driving the DC motor portion 4, and a suction fan portion 5 integrally mounted to the front side of a shaft 41 and 43 of the DC motor portion 4.

The drive circuit 3 includes an inverter 31 driving the DC motor portion 4 by receiving the power from the battery 8 or the power portion 6, and a control circuit 32 (controller) controlling the inverter 31. A switch SW31 turning on or off the connection between the power portion 6 and the inverter 31 may be installed on an AC side power line N11 connecting the power portion 6 and the inverter 31, and a switch SW32 turning on or off the connection between the battery 8 and the inverter 31 may be installed on a DC side power line N12 connecting the battery 8 and the inverter 31.

The AC side power line N11 and the DC side power line N12 may be connected through a diode D11 and D12 so as not to flow back. A switch SW1 may be connected to between a middle node N13 between two diodes, and a control circuit 32 to turn on or off the connection between the middle node N13 and the control circuit 32. Since the middle node N13 is connected to a relay RL33 installed in the control circuit 32, when the relay RL33 is turned on, the middle node N13 may be connected to a control substrate power of the control circuit 32.

The battery 8 may be connected to the power portion 6 through a step-up circuit 7, and the battery 8 may be configured to charge when the power cord 9 is connected to the commercial power.

As illustrated in FIGS. 2A to 4, the mechanism integrated motor 1 is provided with a motor case 11 in which a front end is opened, wherein the front end may correspond to an inlet port 2 communicated with the inlet port of the housing of the cleaner. In the motor case 11, the suction fan portion 5, the DC motor portion 4, the drive circuit 3 and the power portion 6 are sequentially disposed in the front and rear direction with respect to a shaft direction of the DC motor portion 4. That is, the suction fan portion 5, the DC motor portion 4, the drive circuit 3 and the power portion 6 are formed in a mechanism integrated type such that the suction fan portion 5, the DC motor portion 4, the drive circuit 3 and the power portion 6 are surrounded by the motor case 11 having the same diameter φ (e.g., φ=70 mm) and the same height H (e.g., H=110 mm). However, since a conventional small brushless DC motor case has a height of 90 mm when a diameter φ is 70 mm, the height increase may be limited to equal to or less than 20 mm when the drive circuit 3 and the DC motor portion 4 are formed in the mechanism integrated type.

As illustrated in FIG. 2A, the suction fan portion 5 may include a double inverted fan having a first fan 5a and a second fan 5b, which are disposed in the front and rear direction with respect to the shaft 41 and 43 of the DC motor portion 4. Particularly, as illustrated in FIG. 11, the first fan 5a provided in the front side and the second fan 5b provided in the rear side of the first fan 5a may be spaced apart from each other with a certain distance with respect to the shaft 41 and 43 of the DC motor portion 4.

The first fan 5a is a centrifugal fan, in which the center rotation thereof is the shaft center of the DC motor portion 4, and the first fan 5a is provided with a base portion 51 integrally rotated with the shaft 41 of the DC motor portion 4. The base portion 51 may have a truncated cone shape in which a conical surface, having a diameter being increased from the front end to rear end, is provided in an outer circumference thereof. On the conical surface of the base portion 51, a plurality of main blades 52 and auxiliary blades 53, which protrude to the outside of the radial direction, may be alternately disposed in the circumferential direction. The centrifugal fan represents a fan configured to flow air from the inside to the circumferential direction by the centrifugal force generated by the rotation of the plurality of main blades 52 and auxiliary blades 53.

Each main blade 52 is formed in a strip shape. The main blade 52 is extended in an oblique direction while having a shape curved toward one side of the circumferential direction as being close to the front side of the base portion 51. In addition, the base portion 51 may be disposed with a certain distance with each other on the circumference in the circumferential direction. Between the main blades 52, the auxiliary blades 53 are provided. Each auxiliary blade 53 has a triangle plate in which a length in the front and rear direction is shorter than the main blade 52. The auxiliary blade 53 is obliquely extended in the same direction as the main blade 52 in the range from the vicinity of the center of the base portion 51 in the front and rear direction to the rear portion thereof.

The second fan 5b is an axial-flow fan, in which the center rotation thereof is the shaft center of the DC motor portion 4. The second fan 5b is provided with a base portion 56 having a circular plate and being integrally rotated with the cylindrical second shaft 43 of the DC motor portion 4, and a plurality of axial flow blades 57 protruding to the outside in the radial direction and being disposed with a certain distance with each other on the outer circumference surface in the circumferential direction. Each axial flow blade 57 is formed in a strip shape. The axial flow blade 57 is extended in an oblique direction while having a shape curved toward the other side of the circumferential direction (a direction opposite to the direction in which the main blades 52 and the auxiliary blades 53 of the first fan 5a is curved to the front side) as being close to the front side of the base portion 51. The axial flow fan represents a fan in which the direction of the air flow is parallel with the rotary shaft.

The first fan 5a and the second fan 5b are installed as a double inverted fan type. That is, as mentioned above, the inclination of the main blade 52 and the auxiliary blade 53 of the first fan 5a with respect to the center of the rotation is formed in a direction opposite to a direction in which the inclination of the axial flow blade 57 with respect to the center of the rotation is formed. Particularly, the main blade 52 and the auxiliary blade 53 of the first fan 5a are obliquely formed in the rear direction toward one side of the circumferential direction of the shaft 41 while the axial flow blade 57 of the second fan 5b is obliquely formed in the rear direction toward the other side of the circumferential direction of the second shaft 43.

When the size of the first fan 5a is compared with the size of the second fan 5b, a length in the front and rear direction of the first fan 5a toward the center of the rotation is longer than that of the second fan 5b and the outer diameter of the second fan 5b is greater than that of the first fan 5a.

As illustrated in FIGS. 2A and 2B, the DC motor portion 4 includes a plurality of rotors. For example, the DC motor portion 4 is a double rotor type having a brushless DC motor, and includes an inner rotor 4a, an outer rotor 4b and a stator 4c, as illustrated in FIGS. 2A and 2B. The DC motor portion 4 may include a single stator 4c which is commonly used between the inner rotor 4a and the outer rotor 4b. The common stator 4c may perform a function of the stator for the inner rotor 4a and a function of the stator for the outer rotor 4b.

The single common stator 4c may be disposed between the inner rotor 4a and the outer rotor 4b. That is, the stator 4c may be provided in the outside of the inner rotor 4a and the inside of the outer rotor 4b. In this case, the stator 4c may be formed in a hollow cylindrical shape and the inner rotor 4a may be provided in the inside of the stator 4c.

The inner rotor 4a is integrally rotated with the first shaft 41 on the circumference, and the shaft 41 is connected to the first fan 5a of the suction fan portion 5. As the inner rotor 4a is rotated in one direction with respect to the first shaft 41, the first fan 5a is rotated in the same direction as the first shaft 41. On the other hand, the outer rotor 4b is integrally rotated with the cylindrical second shaft 43, and the first shaft 41 is inserted into the second shaft 43 to be relatively rotatable. The second shaft 43 is connected to the second fan 5b of the suction fan portion 5 and as the outer rotor 4b is rotated in one direction with respect to the second shaft 43, the second fan 5b is rotated in the same direction with respect to the second shaft 43. The inner rotor 4a and the outer rotor 4b are rotated in opposite directions to each other at a rotation speed having a predetermined ratio, e.g., 1:1, 1:2, or 2:1.

The motor case 11 includes a case body 11a covering an outer circumference in the axis direction of the suction fan portion 5 and the DC motor portion 4, a metal case portion (metal portion) 11b successively and integrally connected to the rear portion of the case body 11a, and a rear case portion 11c successively and integrally connected to the rear portion of the metal case portion 11b. Particularly, the case body 11a and the metal case portion 11b are connected such that the outside of a connecting portion 11d, which is integrally installed in the case body 11a, is covered by the metal case portion 11b (refer to FIG. 3). The metal case portion 11b and the rear case portion 11c are connected such that the outside of a connecting portion 11e installed in the metal case portion 11b is covered by the rear case portion 11c (refer to FIG. 4). In addition, the metal case portion 11b is not shown in FIG. 3 and the rear case portion 11c and the power portion 6 (except for a heat sink plate described later) are not shown in FIG. 4.

The case body 11a is formed of or coated with an insulating material so that it is possible to secure the safety while maintaining a distance to the DC motor portion 4. The metal case portion 11b may be formed of aluminum to cover the outer circumference in the front side of the drive circuit 3 and the power portion 6. The circumference in the rear side of the power portion 6 is covered with the rear case portion 11c. In the rear case portion 11c, a plurality of airflow holes 11f, which is configured to allow the space in the mechanism integrated motor 1 to be communicated with the outside space in the radial direction, may be installed in the entire circumferential direction with the same pitch.

In general, the drive circuit 3 may correspond to an inverter driving a motor. When the motor has a single phase, the drive circuit 3 may be a H-Bridge circuit and when motor has three phases, the drive circuit 3 may be a driver circuit having six elements. Although the DC motor portion 4 drives two rotors (the inner rotor 4a and the outer rotor 4b), a single inverter is provided as in the case of driving one motor.

The drive circuit 3 and the power portion 6 may be mounted on a multi-layer substrate 38 and 61 (e.g., four layer substrate), respectively. The drive circuit 3 and the power portion 6 may be sequentially disposed from the front side so that the multi-layer substrate 38 and 61 are perpendicular to the axis direction of the DC motor portion 4. The multi-layer substrate 38 and 61 have a circular shape in a plan view and the size of the substrate is $\varphi 2$ ($\varphi 2 < \varphi 1$, e.g., $\varphi 2 = 65$ mm). By using the above mentioned substrate, it is possible to respond to the large current.

A pin 39 is installed in the inside of the metal case portion 11b in the middle portion of the axis direction of the DC motor portion 4, wherein the pin 39 is provided with a plurality of ribs, which successively and integrally protrudes toward the inside from the metal case portion 11b while being disposed in the circumferential direction with the same pitch. In addition, the multi-layer substrate 38 and the DC motor portion 4 are integrally connected through a connecting member (support) 37.

It is appropriate that the power portion 6 is a non-isolated type to minimize the number of components. FIGS. 5 to 7 illustrate the power portion 6 corresponding to the flyback converter type, in which the number of components is less among the non-isolated type. FIGS. 5 and 6 illustrate a component arrangement diagram, and FIG. 7 illustrates a circuit diagram.

As illustrated in FIG. 7, the power portion 6 is provided with a bridge-type rectification portion DB6 receiving the AC power via the power cord 9, a smoothing condenser C62 smoothing the rectified voltage, a diode D6 and a switching element Q6 serially connected between the power and ground in the rear end portion of the smoothing condenser C62, a resonance circuit 62 and a controller 65 controlling the switching element Q6. The controller 65 switches the switching element Q6 by transmitting a control signal to a gate of the switching element Q6, and a similar oscillating IC may be applied as the controller 65. It is appropriate that the switching element Q6 has low ON resistance, and thus the switching element Q6 may employ a low ON resistance type hybrid MOSFET or Insulated Gate Bipolar Transistor (IGBT).

The resonance circuit 62 is formed with a first condenser C61 connected to between a pair of output terminals (OUT) of the power portion 6 and an inductor L6 installed on a signal line connected to either one of the output terminals. It is appropriate that the inductor L6 is small in size and high in performance, and thus a small-sized and high-performance coil may be employed.

The fly back converter type power portion 6 supplies a relatively high frequency and large current to the switching element Q6 and diode D6 and thus the amount of heat generation is increased. Therefore, according to an exemplary embodiment, as illustrated in FIGS. 5 and 6, the switching element Q6 and diode D6 having large amount of heat generation are disposed adjacent to the outer circumference of the multi-layer substrate 61 and at the same time, a heat sink plate 63 and 64 in contact with each element Q6 and D6 from the outside thereof to perform the heat transfer is provided. In addition, the heat sink plate 63 and 64 are connected to the metal case portion 11b to allow the heat transfer so that it is possible to improve the heat dissipation effect (refer to FIG. 4).

As illustrated in FIG. 8, the drive circuit 3 is provided with a second condenser C3 connected to between a pair of input terminals (IN) for the stabilization at the time of the driving by the battery, an electric drive portion 36 driving the DC motor portion 4, and a controller 33 controlling an operation of the electric drive portion 36. The controller 33 controls the driving of the DC motor portion 4 through the electric drive portion 36 based on position information by a position sensor 35 installed adjacent to the DC motor portion 4, and current information SA and voltage information SA related to the driving of the DC motor portion 4. Particularly, the controller 33 transmits a control signal SC1-SC4 to a driver installed in the electric drive portion 36 to drive the DC motor portion 4.

It is assumed that the power consumption is approximately 600 W when implementing a high suction rate (e.g., 180 W or higher) at the time of the driving by the battery. For example, when a lithium ion battery is used as an internal battery, the lithium ion battery may have at least DC 30V, or capability of 20 A.

In order to implement the output (suction rate), which is the same as at the driving by the battery even when connected to the commercial power, it is required that the AC power from the commercial power outputs 600 W while performing step down until the same DC voltage (e.g., DC 30V) as the driving of the battery.

For this, it is needed that the first condenser C61 installed in the power portion 6 and the second condenser C3 installed in the drive circuit 3 have a large capacity (e.g., 4000 μF) to implement the cleaner A having the above mentioned performance, i.e., the cleaner A acquires the high output. Therefore, there are difficulties in the size of the first condenser C61 and the second condenser C3 for miniaturization of the cleaner A.

By sharing a part of the second condenser C3 of the drive circuit 3 and the first condenser C61 of the power portion 6, designers relieves the difficulties and realizes the miniaturization of the mechanism integrated motor 1, i.e., the cleaner A.

Particularly, the capacity of the first condenser C61 of the power portion 6 is reduced to 1/40 or less of the capacity of the second condenser C3 of the drive circuit 3 and then the first condenser C61 of the power portion 6 is disposed adjacent to the inductor L6. The fly back converter type power portion 6 is established by LC resonance of the first condenser C61 and the inductor L6 and thus when impedance, e.g., line impedance, is present between L and C, it may be difficult to stably oscillate.

FIG. 9 illustrates a variation of the output voltage according the change in the capacity of the first condenser C61 of the power portion 6. In FIG. 9, a solid line indicates an output voltage at no-load operation, a broken line indicates the output voltage at the rated load, and a one-dot chain line indicates the voltage drop at the rated load. In addition, the second condenser C3 of the drive circuit 3 is 4000 μF.

As illustrated in FIG. 9, although the capacity of the first condenser C61 is 100 μF corresponding to 1/40 of the capacity of the second condenser C3, the resonance circuit 62 may stably oscillate and output a desired voltage in a state in which the voltage drop hardly occurs. As illustrated in FIG. 9, although the capacity of the first condenser C61 is approximately 60 μF corresponding to approximately 1/65 of the capacity of the second condenser C3, it is possible to output a desired voltage.

By this, it is possible to considerably reduce the size of the first condenser C61 in the power portion 6 in which a relative large compartment (e.g., the smoothing condenser C62, the inductor L6, and the rectification portion DB6) are provided. In other words, since it is possible to sufficiently reduce the size of the first condenser C61, the power portion 6 may be loaded on the multi-layer substrate 61 having the same diameter as the motor case 11 covering the DC motor portion 4 and at the same time, the height increase of the DC motor part 4 may be limited.

Hereinafter an operation of the cleaner according an exemplary embodiment will be described with reference to FIG. 10. FIG. 10 is a flowchart illustrating a case in which the cleaner A starts according to an exemplary embodiment.

When a user pushes a start switch (not shown), the power of the cleaner A is turned on and SW1 (refer to FIG. 1) becomes ON (S1). Therefore, the power portion 6 and the control circuit 32 are connected through the diode and the battery 8 and the control circuit 32 are connected through the diode.

When the AC power is not supplied to the power portion 6 or when there is no remaining amount of the battery 8 (No in S2), the power is not supplied to the control circuit 32 and thus the cleaner A does not operate (S3). Therefore, since a user immediately recognizes whether there is no remaining amount of the battery 8, or whether the cleaner A does not operate due to the disconnection of the power cord 9, the user may immediately take an action for the supply of the power.

When the AC power is supplied to the control circuit 32 from the power portion 6 or the battery 8 (Yes in S2), the relay RL33 in the control circuit 32 is instantaneously turned on so that the power is supplied to the substrate of the control circuit 32 (S4).

Next, the control circuit 32 detects whether the AC power is connected or not. When the AC power is connected (Yes in S5), the control circuit 32 allows the switch SW31 to be ON so that the power portion 6 supplies the power to the inverter 31 (S6). The inverter 31 receiving the power from the power portion 6, drives the DC motor portion 4 (S8).

When the AC power is not connected (No in S5), the control circuit 32 allows the switch SW32 to be ON so that the battery 8 supplies the power to the inverter 31 (S7). The inverter 31 receiving the power from the battery 8, drives the DC motor portion 4 (S8).

Accordingly, even when stopping the power supply to various circuits for the zero standby power of the cleaner A, it is possible to drive the DC motor portion 4 by supplying the power to each circuit, e.g., the control circuit 32, through the drive start operation (power on) by a user. It is described that only the AC power is detected since it is assumed that a user wants the AC operation when the AC power is connected. However, the determination of S5 may be performed according to whether the power of the battery 8 is supplied.

When the DC motor portion 4 is driven, the inner rotor 4a and the outer rotor 4b are rotated in the reverse direction and the first and second fan 5a and 5b of the suction fan portion 5 connected to the rotor 4a and 4b through the shaft 41 and 43 are driven to be rotated in the reverse direction. As a result, the negative pressure is generated in the space on the front side (upstream side) of the suction fan portion 5 and thus the air flows into the motor case 11 from the front side of the inlet port 2. The suction fan portion 5 includes the first fan 5a and the second fan 5b in which the double inversion structure is formed, and thus it is possible to flow a larger amount of air in comparison with a case in which a single fan is provided. The air moves to the rear side along the axis direction of the DC motor portion 4 and discharged to the outside through the air flow hole 1f (refer to the broken line arrow of FIG. 3).

By the air flow, it is possible to improve the cooling effect for the drive circuit 3 and the power portion 6 disposed side by side in the front and rear direction. In addition, by the air flow, the dust in the outside of the cleaner is suctioned together with the air from the inlet port of the housing of the cleaner and then the dust enters the dust box storing the dust. Accordingly, the cleaner A collects the dust.

—Effect—

Therefore, according to an exemplary embodiment, the suction fan portion 5 includes a double rotation fan having the first fan 5a and the second fan 5b, and it is possible to generate the suctioned air flow in the large volume and in the stable manner compared with the conventional single fan. Therefore, it is possible to increase the suction force of the cleaner.

Since the first fan 5a is provided with a mixed flow fan and the second fan 5b is provided with an axial-flow fan, it is possible to flow a large amount of the air, which is in contact with the first fan 5a, toward between blades 52 and 53 while the air flow generated in the first fan 5a is more stable. Since the outer diameter of the first fan 5a is equal to or less than the outer diameter of the second fan 5b, and the length of the first fan 5a in the front and rear direction is greater than that of the second fan 5b, it is possible to certainly guide the air flow generated in the first fan 5a to the second fan 5b so as to improve the performance of the double inverted fan. As a result, it is possible for the stick type cyclone cleaner to increase the suction rate of 180 W or more and thus the high efficiency is realized. The mixed flow fan represents a fan having a function of the axial flow fan and the centrifugal fan, i.e., a fan having a concept of the middle between the axial flow fan and the centrifugal fan.

Since the air flow generated in the double inverted fan of the suction fan portion 5 flows to the inside of the motor case 11, it is possible to improve the cooling effect for the drive circuit 3 and the power portion 6 disposed side by side in the front and rear direction. Therefore, it is possible to implement the high output of the power portion 6 and the drive circuit 3 while implementing the miniaturization thereof.

Another Exemplary Embodiment

According to the above mentioned embodiment, the double inverted fan of the suction fan portion 5 is configured such that the first fan 5a is the centrifugal fan and the second fan 5b is the axial flow fan. However, instead of the centrifugal fan, the first fan 5a may be provided with the mixed flow fan or the axial flow fan, and the first fan 5a and the second fan 5b may be rotated in the same direction.

The number of the main blade 52 and the auxiliary blade 53 of the first fan 5a, and the number of the axial flow blade 57 of the second fan 5b may vary.

Instead of the double rotor type drive motor according to one exemplary embodiment, two drive motors each having a single rotor may be used to drive the first fan 5a and the second fan 5b.

It has been described that a part of the second condenser C3 of the drive circuit 3 and the first condenser C61 of the power portion 6 is shared, but is not limited thereto. As line impedance between the inductor L6 of the power portion 6 and second condenser C3 of the drive circuit 3 is minimized, all part thereof may be shared with the second condenser C3 of the drive circuit 3. Particularly, a rear surface of the substrate of the drive circuit 3 is brought into close contact with a rear surface of the substrate of the power portion 6, i.e., both rear surface of the substrate of the drive circuit 3 and the power portion 6 are in contact with each other through an insulation layer, e.g., an insulating sheet, and at the same time, the inductor L6 and the second condenser C3 may be disposed in positions in which the wiring between the inductor L6 and the second condenser C3 is shortened. Accordingly, it is possible to further miniaturize the power portion 6.

According to another exemplary embodiment, the same effect as one exemplary embodiment may be achieved.

Hereinafter detailed disclosed examples will be described.

Example

In the cleaner according to the exemplary embodiment, air volume-static pressure characteristic is measured. In this measurement, a predetermined air volume is blown to the suction fan portion, and at that time, the maximum value of static pressure, which can be acquired by the suction fan portion, is measured. The measurement results are shown in FIG. 12.

Comparative Example

The same measurement as in the example is performed on a conventional single fan cleaner. As the single fan, the first fan (centrifugal fan) of the exemplary embodiment is used alone. The measurement results are shown in FIG. 12.

(Evaluation of Measurement Result)

As illustrated in FIG. 12, regardless of the amount of the air volume, the air volume-static pressure characteristic is improved in the cleaner having the substantially double inverted fan compared with the clear having a single fan. Accordingly, as the rotation direction of the front end portion and the rotation direction of the rear end portion of the cleaner are opposite to each other and the direction of the blowing wind is the same, the wind flows straight and the air volume-static pressure characteristic is improved.

As is apparent from the above description, it is possible to improve the suction rate of the cleaner.

As the cleaner has the high suction rate, it is highly likely to be used industrially.

The invention claimed is:

1. A cleaner comprising:
a suction fan portion comprising a first fan and a second fan; and
a driver driving the suction fan portion and comprising:
   a driving motor including a first rotor configured to rotate the first fan,
   a second rotor configured to rotate the second fan, and
   a stator commonly used for the first rotor and the second rotor,
wherein:
   the second fan is an axial flow fan in which a direction of air flow is parallel with a rotary shaft, and
   the first fan is one of a centrifugal fan flowing air from the inside to a circumferential direction by a centripetal force or a mixed flow fan having a middle characteristic between the axial flow fan and the centrifugal fan.

2. The cleaner of claim 1, wherein the driving motor is provided with two rotors and a single stator.

3. The cleaner of claim 1, wherein the first fan and the second fan are rotated in opposite directions to each other.

4. The cleaner of claim 1, wherein:
the driving motor corresponds to a brushless DC motor, and
the first rotor is an inner rotor, the second rotor is an outer rotor, and the stator is disposed between the inner rotor and the outer rotor.

5. The cleaner of claim 1, further comprising:
an inverter controlling a rotation of the first and second rotor.

6. The cleaner of claim 1, further comprising:
a power portion having a battery and an AC-DC converter to supply electricity to the driving motor.

7. The cleaner of claim 6, wherein:
the AC-DC converter is a non-isolated flyback converter,
the battery and the AC-DC converter comprise a DC output condenser, respectively, and
an electric capacity of a condenser in the driving motor is at least 40 times greater than the electric capacity of a condenser in the AC-DC converter.

8. The cleaner of claim 6, further comprising:
a start switch starting an operation; and
a controller supplying power to the driving motor from at least any one of the battery and the AC-DC converter, when the start switch is pushed.

9. The cleaner of claim 6, further comprising:
a motor case corresponding to a container for the driving motor; and
a heat sink plate dissipating a heat of the power portion,
wherein the motor case comprises a metal portion, and
wherein the heat sink plate and the metal portion of the motor case are connected to allow a heat transfer.

10. The cleaner of claim 1, wherein the cleaner is a cordless stick type cleaner.

11. A cleaner comprising:
an inlet port; and
a suction fan portion communicated with the inlet port and comprising a first fan and a second fan rotated in a direction opposite to the first fan,
wherein:
   the first fan is installed closer to the inlet port than the second fan,
   the second fan is an axial flow fan in which a direction of air flow is parallel with a rotary shaft, and
   the first fan is one of a centrifugal fan flowing air from the inside to a circumferential direction by a centripetal force or a mixed flow fan having a middle characteristic between the axial flow fan and the centrifugal fan.

12. The cleaner of claim 11, wherein:
an outer diameter of the first fan is equal to or less than an outer diameter of the second fan, and
a length of the first fan in the direction toward a center of a rotation is longer than a length of the second fan in the direction toward a center of a rotation.

13. A cleaner comprising:
a suction fan portion comprising a first fan and a second fan; and
a driver driving the suction fan portion and comprising a driving motor including:
   an inner rotor configured to rotate the first fan,
   an outer rotor configured to rotate the second fan, and
   a stator commonly used for the outer rotor and the inner rotor and disposed between the inner rotor and the outer rotor.

14. The cleaner of claim 13, wherein any one of the first fan and the second fan is an axial flow fan in which a direction of air flow is parallel with a rotary shaft.

15. The cleaner of claim 13, wherein:
any one of the first fan and the second fan is an axial flow fan in which a direction of air flow is parallel with a rotary shaft, and
an other fan is one of a centrifugal fan flowing air from the inside to a circumferential direction by a centripetal force or a mixed flow fan having a middle characteristic between the axial flow fan and the centrifugal fan.

16. The cleaner of claim 13, wherein the first fan and the second fan are rotated in opposite directions to each other.

17. The cleaner of claim 13, wherein the driving motor corresponds to a brushless DC motor.

* * * * *